US012573869B2

(12) United States Patent
Kuroda et al.

(10) Patent No.: US 12,573,869 B2
(45) Date of Patent: Mar. 10, 2026

(54) STORAGE BATTERY APPARATUS

(71) Applicant: KABUSHIKI KAISHA TOSHIBA, Tokyo (JP)

(72) Inventors: Kazuto Kuroda, Tokyo (JP); Yusuke Kikuchi, Kawasaki (JP); Ryo Nozawa, Kawasaki (JP); Kota Asami, Tokyo (JP); Tomohide Yoshikawa, Fuchu (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 884 days.

(21) Appl. No.: 17/654,851

(22) Filed: Mar. 15, 2022

(65) Prior Publication Data

US 2022/0200316 A1     Jun. 23, 2022

Related U.S. Application Data

(63) Continuation of application No. PCT/JP2019/036397, filed on Sep. 17, 2019.

(51) Int. Cl.
*H02J 7/00* (2006.01)
*H01M 10/42* (2006.01)
*H01M 10/48* (2006.01)

(52) U.S. Cl.
CPC ....... *H02J 7/00714* (2020.01); *H01M 10/425* (2013.01); *H01M 10/482* (2013.01); (Continued)

(58) Field of Classification Search
CPC ............. H01M 10/425; H01M 10/482; H01M 2010/4271; H01M 10/44; H01M 10/486; (Continued)

(56) References Cited

U.S. PATENT DOCUMENTS 5,596,258 A      1/1997  Kimura et al.
2011/0261861 A1 *  10/2011  Lee ........................ H04B 1/715
                                                    375/132
(Continued)

FOREIGN PATENT DOCUMENTS

CN      104885326 A      9/2015
EP          3416231 A1 *  12/2018  ............ H01M 10/63
(Continued)

OTHER PUBLICATIONS

Extended European Search Report issued on Oct. 10, 2022, in corresponding European Application No. 19945830.8, 7 pages.

(Continued)

*Primary Examiner* — Rexford N Barnie
(74) *Attorney, Agent, or Firm* — Maier & Maier, PLLC

(57) ABSTRACT

According to one embodiment, a storage battery apparatus includes: a plurality of storage battery modules each including a battery module, which includes a plurality of battery cells, and a cell monitoring unit measuring voltages of the battery cells and a temperature of the battery module; and a battery management unit periodically receiving measurement values of the voltages of the battery cells and the temperature of the battery module. When there is interference in communication with the plurality of cell monitoring units, the battery management unit extends a communication cycle with the cell monitoring units, sets a value of a chargeable current and a value of a dischargeable current of the battery module, which correspond to at least the communication cycle.

5 Claims, 7 Drawing Sheets

(52) U.S. Cl.
   CPC ........ *H02J 7/00032* (2020.01); *H02J 7/0013*
      (2013.01); *H02J 7/0048* (2020.01); *H02J*
      *7/005* (2020.01); *H01M 2010/4271* (2013.01)

(58) Field of Classification Search
   CPC ........... H01M 2010/4278; H01M 10/48; H02J
      7/00032; H02J 7/0013; H02J 7/0048;
      H02J 7/005; H02J 7/0047; Y02E 60/10
   USPC ........................................................ 320/118
   See application file for complete search history.

(56)                    References Cited

U.S. PATENT DOCUMENTS

| | | | |
|---|---|---|---|
| 2011/0313613 A1* | 12/2011 | Kawahara | B60L 50/61 |
| | | | 320/134 |
| 2015/0254787 A1 | 9/2015 | Eger et al. | |
| 2016/0056510 A1 | 2/2016 | Takeuchi et al. | |
| 2016/0134116 A1* | 5/2016 | Carlson | H02J 13/00007 |
| | | | 709/206 |
| 2016/0336770 A1* | 11/2016 | Benz | H02J 7/005 |
| 2016/0356857 A1* | 12/2016 | Kaupp | B60L 58/18 |
| 2017/0126032 A1 | 5/2017 | Beaston | |

| | | | |
|---|---|---|---|
| 2020/0076013 A1 | 3/2020 | Sato | |
| 2020/0412146 A1* | 12/2020 | Takechi | H02J 7/005 |
| 2025/0327869 A1* | 10/2025 | Mcveigh | G01R 31/371 |

FOREIGN PATENT DOCUMENTS

| | | | |
|---|---|---|---|
| JP | 6-343202 A | 12/1994 | |
| JP | 2013070441 A | 4/2013 | |
| JP | 2014-54003 A | 3/2014 | |
| JP | WO 2014/103008 A1 | 7/2014 | |
| JP | WO 2015/189898 A1 | 12/2015 | |
| JP | 2017-108295 A | 6/2017 | |
| JP | 2018-81837 A | 5/2018 | |
| WO | 2015189898 A1 | 12/2015 | |
| WO | 2018173157 A1 | 9/2018 | |
| WO | WO-2025134662 A1 * | 6/2025 | H02J 7/00 |

OTHER PUBLICATIONS

International Search Report issued Oct. 21, 2019 in PCT/JP2019/036397, filed on Sep. 17, 2019, 1 page.
Office Action issued on Aug. 22, 2025 in corresponding Chinese Application No. 201980095907.1, 8 pages.
Office Action issued on May 20, 2025, in corresponding Chinese Application No. 201980095907.1, 35 pages.

* cited by examiner

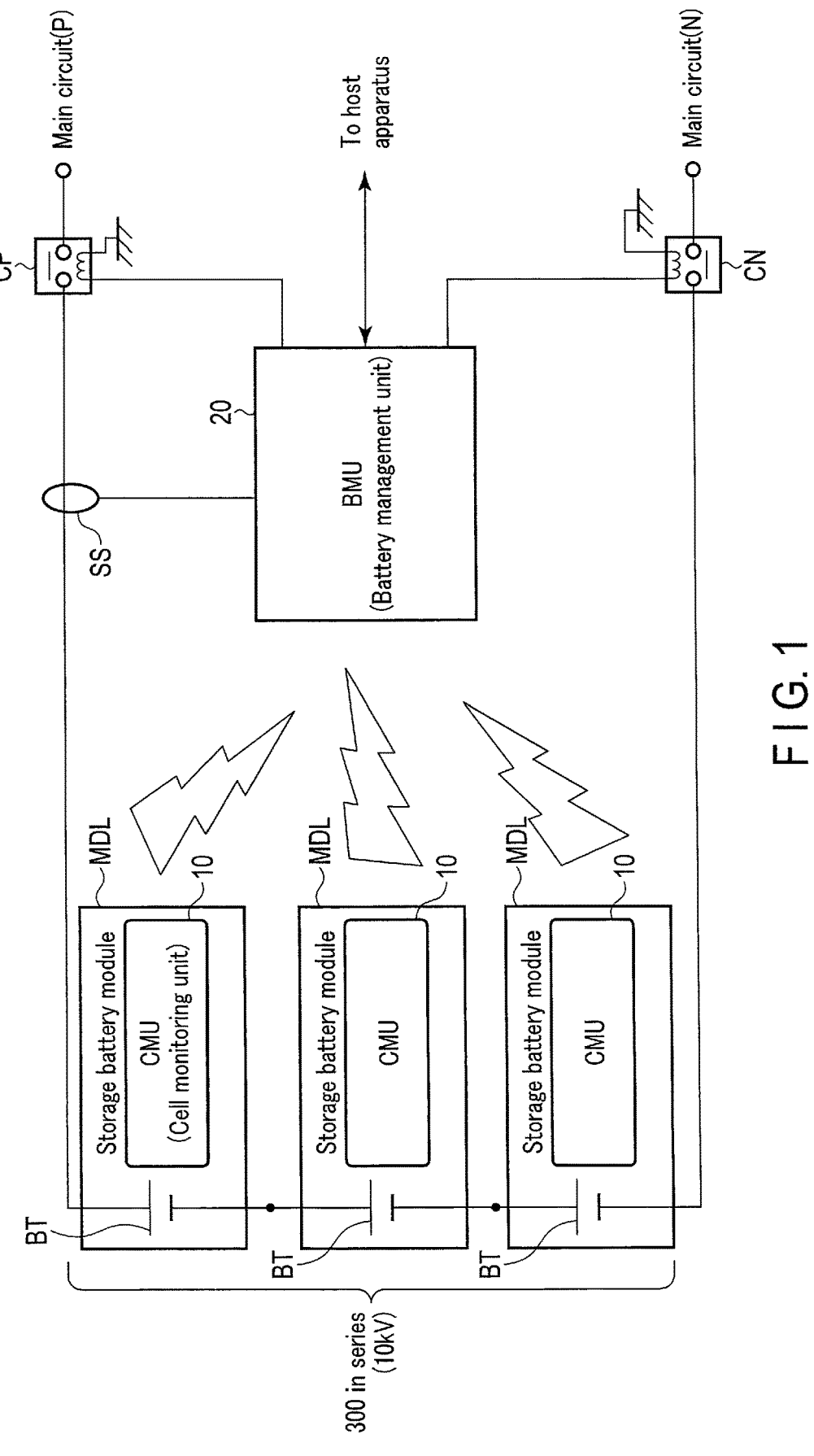
F I G. 1

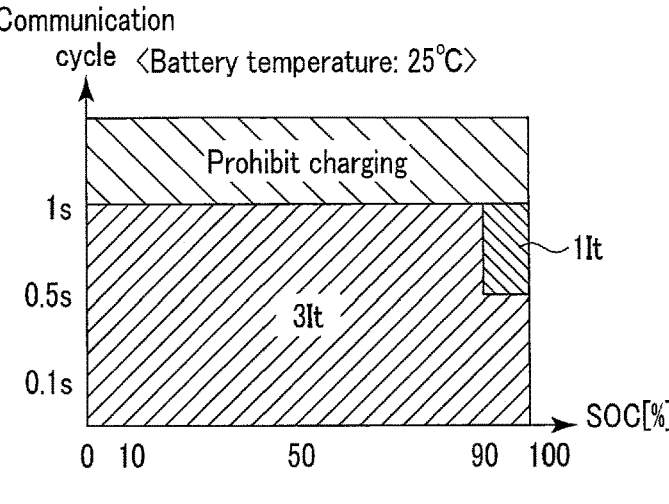
F I G. 4A
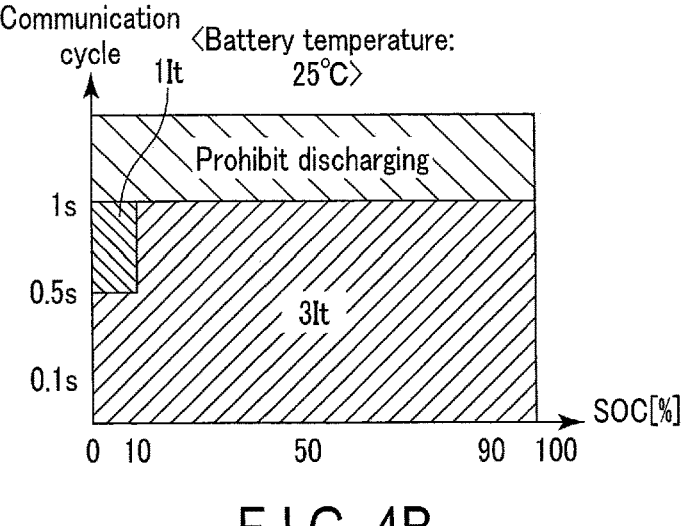
F I G. 4B
F I G. 4C

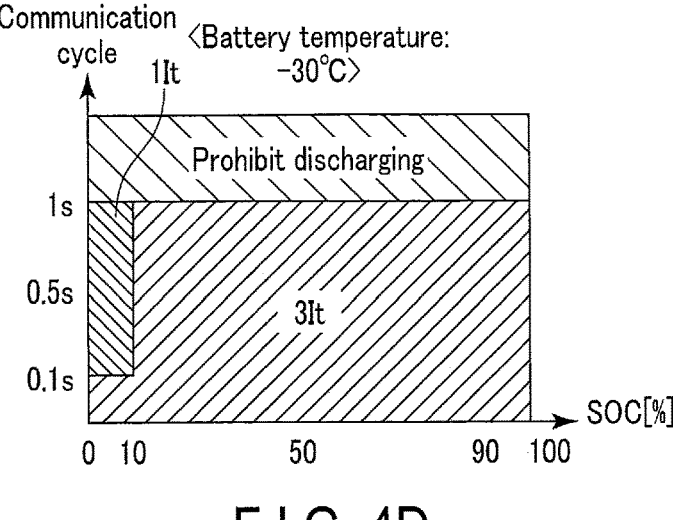
F I G. 4D
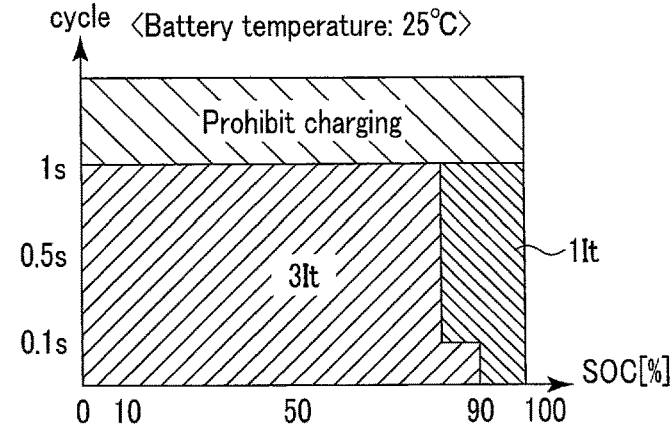
F I G. 5A
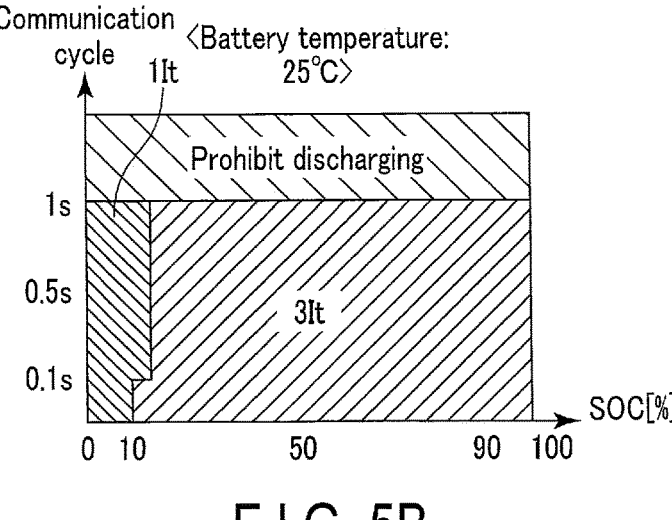
F I G. 5B

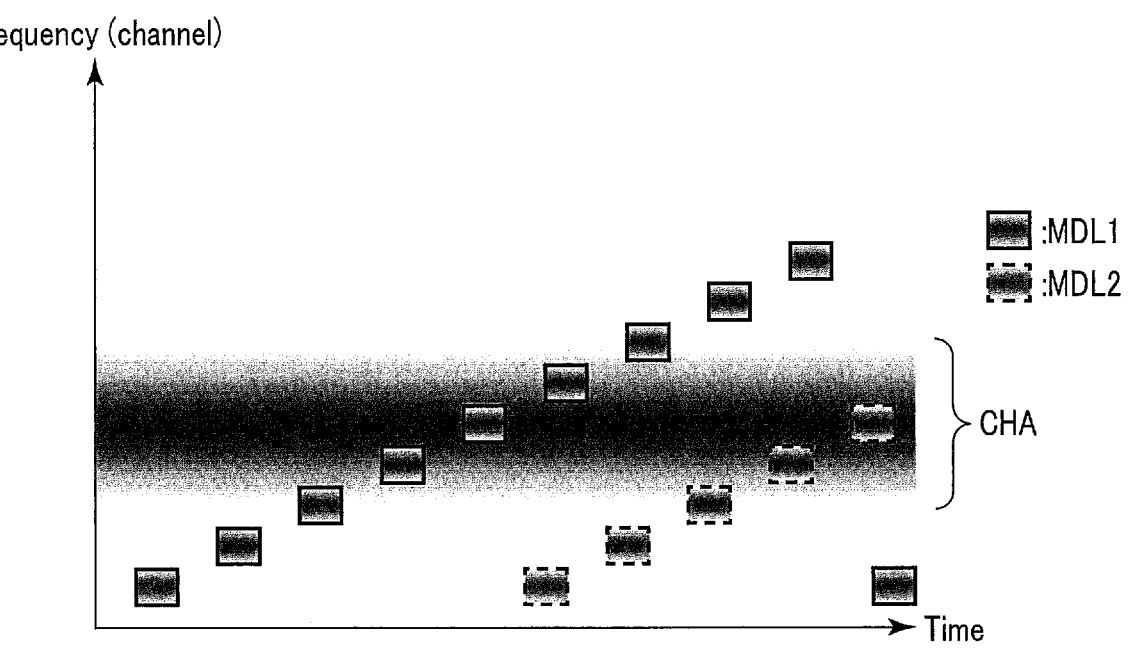
F I G. 6
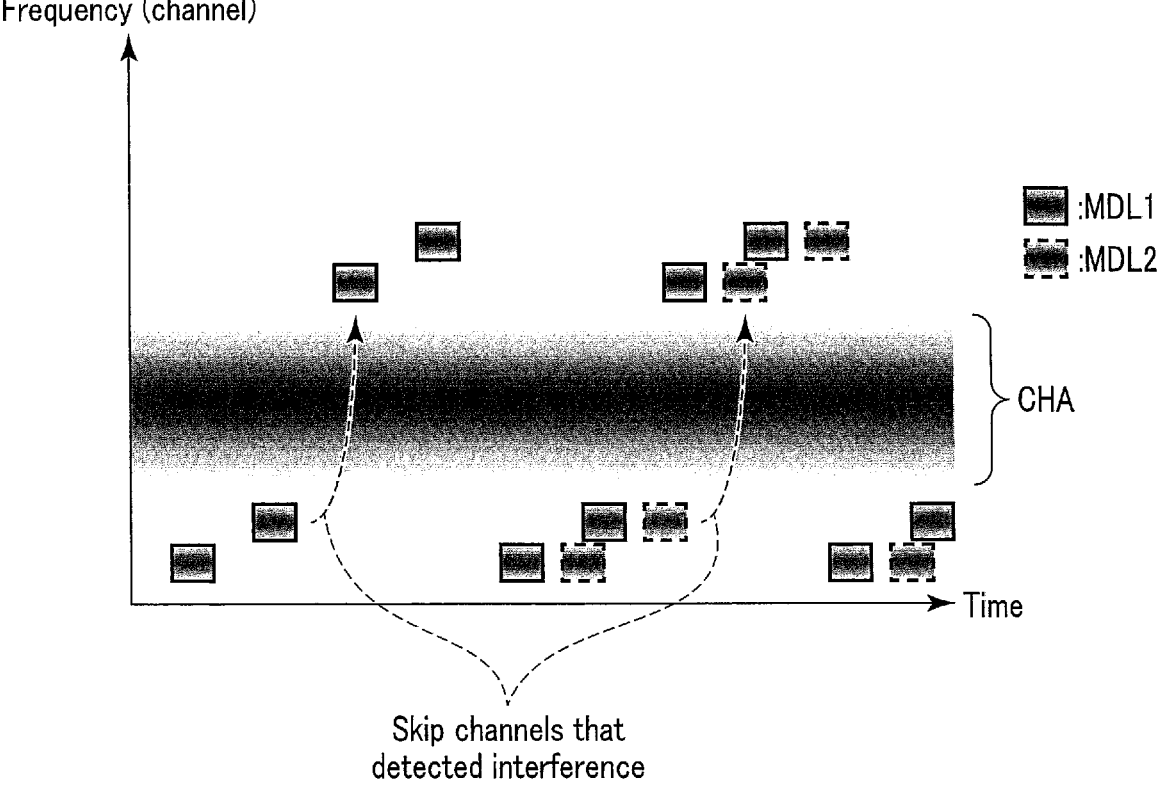
F I G. 7

STORAGE BATTERY APPARATUS

CROSS-REFERENCE TO RELATED APPLICATIONS

This is a Continuation Application of PCT Application No. PCT/JP2019/036397, filed Sep. 17, 2019, the entire contents of which are incorporated herein by reference.

FIELD

Embodiments described herein relate to a storage battery apparatus.

BACKGROUND

A storage battery apparatus obtained by combining a plurality of storage battery modules is used for various purposes. In recent years, for the purpose of simplifying a configuration of the storage battery apparatus, it has been studied to achieve wireless communication between a storage battery module and a management apparatus using radio waves.

On the other hand, there is a possibility that wireless communication using radio waves may cause a failure due to interference, and thus, it has been conventionally proposed to ensure reliability of communication by taking a measure of, for example, providing a plurality of transmission means.

However, it is impossible to completely eliminate the possibility of occurrence of a failure due to interference in communication using radio waves, and thus, there has been a demand for a measure for enhancing availability of the storage battery apparatus by causing the storage battery apparatus to operate even in a case where interference occurs.

BRIEF DESCRIPTION OF THE DRAWINGS

FIG. 1 is a diagram schematically illustrating a configuration example of a storage battery apparatus according to an embodiment.

FIG. 4A is a diagram illustrating an example of values of a chargeable current and a dischargeable current corresponding to a communication cycle between a cell monitoring unit and the battery management unit, an SOC and an SOH of a battery module, and a temperature of the battery module.

FIG. 4B is a diagram illustrating an example of values of a chargeable current and a dischargeable current corresponding to a communication cycle between a cell monitoring unit and the battery management unit, an SOC and an SOH of a battery module, and a temperature of the battery module.

FIG. 4C is a diagram illustrating an example of values of a chargeable current and a dischargeable current corresponding to a communication cycle between a cell monitoring unit and the battery management unit, an SOC and an SOH of a battery module, and a temperature of the battery module.

FIG. 4D is a diagram illustrating an example of values of a chargeable current and a dischargeable current corresponding to a communication cycle between a cell monitoring unit and the battery management unit, an SOC and an SOH of a battery module, and a temperature of the battery module.

FIG. 5A is a diagram illustrating an example of values of a chargeable current and a dischargeable current corresponding to a communication cycle between a cell monitoring unit and the battery management unit, an SOC and an SOH of a battery module, and a temperature of the battery module.

FIG. 5B is a diagram illustrating an example of values of a chargeable current and a dischargeable current corresponding to a communication cycle between a cell monitoring unit and the battery management unit, an SOC and an SOH of a battery module, and a temperature of the battery module.

FIG. 6 is a diagram for explaining an example of a scheme of wireless communication to be performed between the cell monitoring unit and the battery management unit.

FIG. 7 is a diagram for explaining an example of a scheme of wireless communication to be performed between the cell monitoring unit and the battery management unit in the storage battery apparatus of a second embodiment.

DETAILED DESCRIPTION

Figure 2:
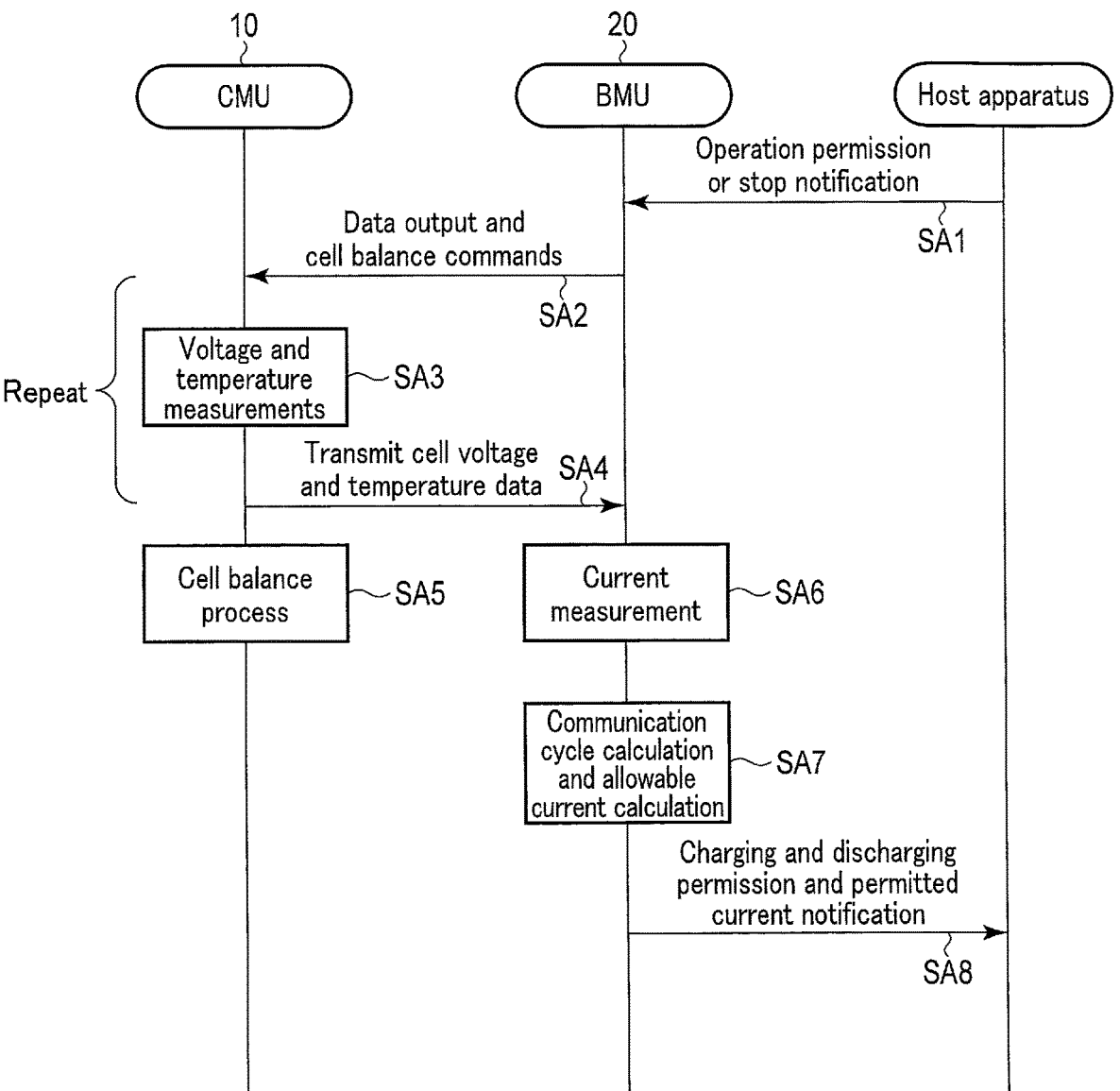
FIG. 2 is a diagram for explaining an example of operation of the storage battery apparatus according to the embodiment.

According to one embodiment, a storage battery apparatus includes: a plurality of storage battery modules, each of the storage battery modules including a battery module including a plurality of battery cells, and a cell monitoring unit configured to measure voltages of the battery cells and a temperature of at least one portion of the battery module; and a battery management unit configured to perform communication with the plurality of cell monitoring units using a radio wave and periodically receive measurement values of the voltages of the battery cells and a measurement value of the temperature of the battery module. In a case where it is determined that there is interference in communication with the plurality of cell monitoring units, the battery management unit extends a communication cycle with the cell monitoring units, sets a value of a chargeable current and a value of a dischargeable current of the battery module, which correspond to at least the communication cycle, and notifies a host apparatus of the set values.

A configuration example of the storage battery apparatus according to a first embodiment will be described in detail below with reference to the drawings.

FIG. 1 is a diagram schematically illustrating a configuration example of a storage battery apparatus according to an embodiment.

The storage battery apparatus of the present embodiment includes a plurality of storage battery modules MDL, a battery management unit (BMU) 20, a current sensor SS, and electromagnetic contactors CP and CN.

The storage battery module MDL includes a battery module BT including a plurality of battery cells (not illustrated), and a cell monitoring unit (CMU) 10.

The battery module BT includes, for example, a plurality of battery cells of lithium ion batteries connected in series or in parallel.

The cell monitoring unit 10 includes a measurement circuit which detects a voltage of each of the plurality of battery cells and a temperature of at least one portion of the battery module ET, and a wireless transmission/reception circuit (not illustrated) capable of performing wireless communication with the battery management unit 20 using radio waves, and can periodically transmit a measurement value to the battery management unit 20.

In addition, the cell monitoring unit 10 equalizes the voltages (cell balance) of the plurality of battery cells based on a control signal received from the battery management unit 20.

The cell monitoring unit 10 may be configured with, for example, hardware, software, or a combination of hardware and software. The cell monitoring unit 10 is a circuit which includes, for example, at least one processor such as a CPU and an MPU, and a memory in which a program to be executed by the processor is recorded, and which realizes the above operation by software.

In the storage battery apparatus of the present embodiment, a total of 300 battery cells are connected in series by connecting the plurality of storage battery modules MDL in series, and a voltage between a main circuit on a high electric potential side and a main circuit on a low electric potential side at the time of full charge is set at 10 kV.

The current sensor SS detects a value of a current flowing through the main circuit on the high electric potential side, and supplies a detection value to the battery management unit 20.

The electromagnetic contactor CN is interposed in a main circuit which connects a terminal on the lowest electric potential side of the plurality of storage battery modules MDL and a negative electrode terminal, and can switch an electrical connection between the plurality of storage battery modules MDL and the negative electrode terminal. The electromagnetic contactor CN is controlled to open and close the contact by a control signal from the battery management unit 20.

The electromagnetic contactor CP is interposed in a main circuit which connects a terminal on the highest electric potential side of the plurality of storage battery modules MDL and a positive electrode terminal, and can switch an electrical connection between the plurality of storage battery modules MDL and the positive electrode terminal. The electromagnetic contactor CP is controlled to open and close the contact by a control signal from the battery management unit 20.

The battery management unit 20 can communicate with each of the plurality of cell monitoring units 10 and a host control circuit (not illustrated). In the storage battery apparatus of the present embodiment, the battery management unit 20 includes a communication circuit which is capable of performing wireless communication using radio waves with the plurality of cell monitoring units 10 and performing wired communication with the host control circuit.

The battery management unit 20 can receive various kinds of control signals from the host control circuit and can control operation of the plurality of cell monitoring units 10 and the electromagnetic contactors CN and CP based on the received information.

The battery management unit 20 periodically receives detection values of the voltages of the plurality of battery cells (or the battery modules BT) and a detection value of the temperature of the battery module BT from each of the plurality of cell monitoring units 10, and periodically receives a detection value of current flowing through the plurality of battery modules BT from the current sensor SS. The battery management unit 20 can calculate a state of charge (SOC) and a state of health (SOH) of the battery module BT (or the battery cell) based on the received values. The SOC of the battery module BT is, for example, a ratio of current capacity [Ah] of the battery module BT to capacity [Ah] at full charge of the battery module BT (=(current capacity/capacity at full charge)×100). The SOH of the battery module BT is, for example, a ratio of current capacity [Ah] at full charge to an initial value [Ah] of capacity at full charge of the battery module BT (=(initial value of capacity at full charge/capacity at current full charge)×100).

The battery management unit 20 monitors voltages of the plurality of battery cells and a current flowing through the plurality of battery modules BT, and controls the cell monitoring units 10 so as to equalize the voltages of the plurality of battery cells. For example, the battery management unit 20 controls operation of a battery system so that the battery cell is not in an abnormal state such as over-charge and over-discharge.

The battery management unit 20 may be configured with hardware, software, or a combination of hardware and software. The battery management unit 20 may include, for example, at least one processor, and a memory in which a program to be executed by the processor is recorded.

Next, an example of operation of the storage battery apparatus of the present embodiment will be described.

FIG. 2 is a diagram for explaining an example of operation of the storage battery apparatus according to the embodiment.

In a case where the battery management unit 20 receives an operation permission notification or a stop notification from a host apparatus (step SA1), the battery management unit 20 transmits a data output command of the measurement value and a cell balance command to the plurality of cell monitoring units 10 (step SA2).

The battery management unit 20 may transmit the data output command and the cell balance command to the plurality of cell monitoring units 10, or may sequentially transmit the commands to the plurality of cell monitoring units 10 at different timings.

In a case where the cell monitoring unit 10 receives the data output command and the cell balance command from the battery management unit 20, the cell monitoring unit 10 measures voltages of the plurality of battery cells and a temperature of at least one portion of the battery module BT (step SA3), and transmits the measurement values to the battery management unit 20 (step SA4).

The battery management unit 20 and the cell monitoring unit 10 repeat processing from step SA2 to step SA4 described above. In other words, when the battery management unit 20 receives the measurement values of the voltages and the measurement value of the temperature from the cell monitoring unit 10, the battery management unit 20 updates the cell balance command based on the received voltage value, and transmits the data output command and the cell balance command to the plurality of cell monitoring units 10 (step SA2). Note that in the present embodiment, a period from when the battery management unit 20 performs processing in step SA2 until when the battery management unit 20 performs processing in the next step SA2 is defined as a communication cycle between the battery management unit 20 and the cell monitoring unit 10.

Subsequently, the cell monitoring unit 10 updates a state of a cell balance circuit (not illustrated) so as to equalize voltages of the plurality of battery cells in accordance with the cell balance command received from the battery management unit 20 (step SA5). For example, the cell monitoring unit 10 switches a switching element of the cell balance circuit (not illustrated) in accordance with the cell balance command received from the battery management unit 20 so as to discharge the battery cell whose voltage is largely different from voltages of other battery cells.

After the battery management unit 20 receives the measurement values of the voltages and the measurement values of the temperatures from the plurality of cell monitoring units 10, the battery management unit 20 receives a detection value of the current flowing through the main circuit on the high electric potential side from the current sensor SS (step SA6).

Note that in the example illustrated in FIG. 2, the battery management unit 20 receives the measurement values of the voltages and the temperatures from the cell monitoring units 10 and then receives the measurement value of the current from the current sensor SS. However, the order of the above operation may be reversed, and the operation of receiving the measurement values of the voltages and the temperatures from the cell monitoring units 10 may be performed in parallel to the operation of receiving the measurement value of the current from the current sensor SS.

Subsequently, the battery management unit 20 performs calculation for setting the communication cycle with the cell monitoring unit 10 and allowable currents (a chargeable current and a dischargeable current) of the battery module BT based on the values of the voltages and the temperature received from the cell monitoring unit 10 and the value received from the current sensor SS (step SA7).

In the present embodiment, the battery management unit 20 determines whether or not a failure due to interference occurs during communication with the plurality of cell monitoring units 10, and extends a communication cycle with the cell monitoring unit 10 in a case where the interference occurs. The battery management unit 20 extends the communication cycle with the cell monitoring unit 10, for example, in a case where the number of times of retransmission due to a communication failure reaches equal to or larger than a predetermined number of times in a predetermined period.

In this event, the battery management unit 20 sets values of the chargeable current and the dischargeable current in accordance with the communication cycle, the SOC and the SOH of the battery module BT, and the temperature of the battery module BT, and notifies an apparatus (for example, a host apparatus) which charges and discharges the battery module BT of the set values. The battery management unit 20 also determines whether or not to permit charging and discharging to the battery module BT, and makes a notification as to whether or not to permit charging and discharging along with the values of the chargeable current and the dischargeable current (step SA8).

Figure 3:
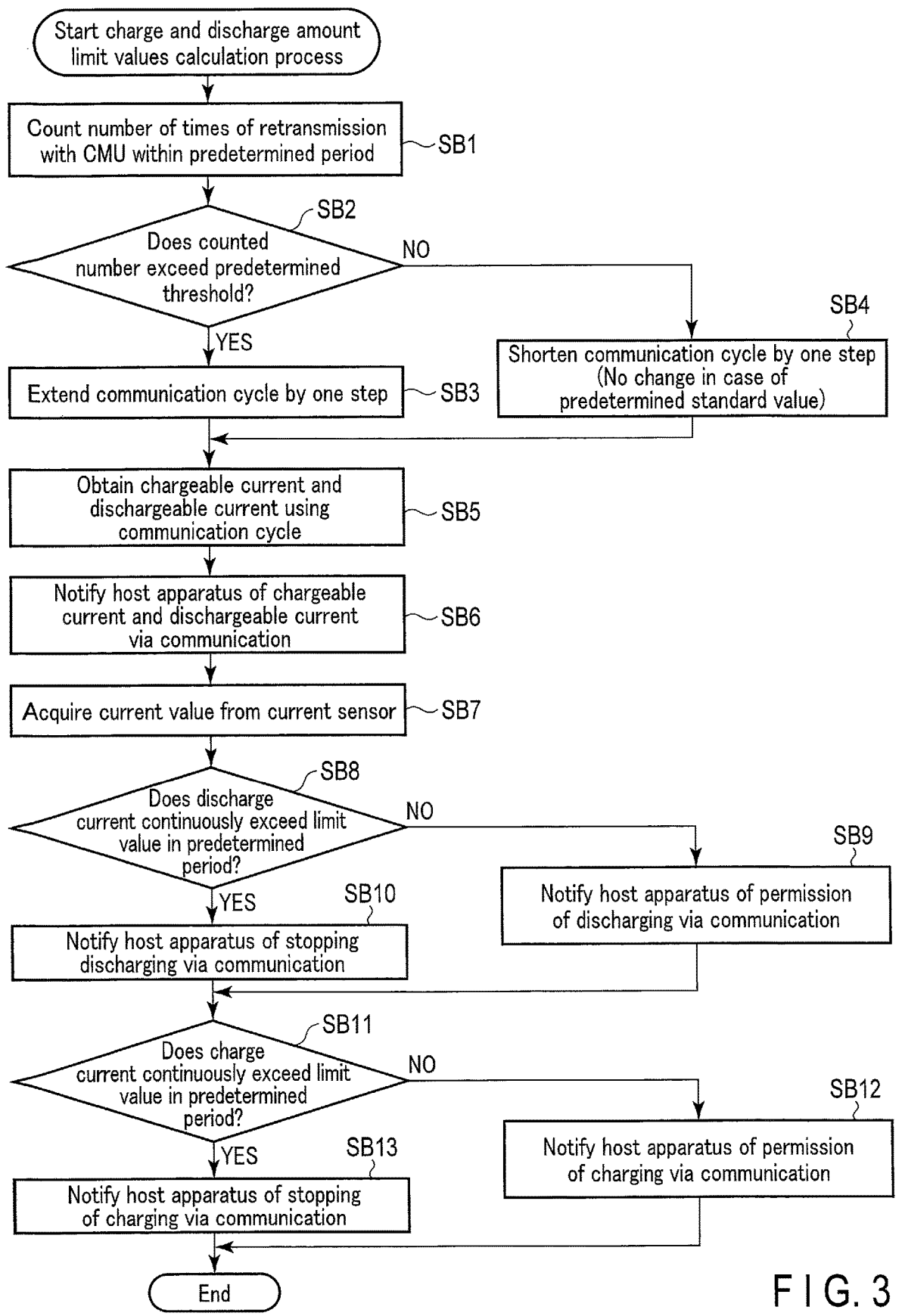
FIG. 3 is a flowchart for explaining an example of operation of a battery management unit in the storage battery apparatus according to the embodiment.

FIG. 3 is a flowchart for explaining an example of operation of a battery management unit in the storage battery apparatus according to the embodiment. Here, an example of the operation in step SA8 of the battery management unit 20 will be described.

The battery management unit 20 counts the number of times of retransmission as a result of attempting communication with the plurality of cell monitoring units 10 within a predetermined period (step SB1), and determines whether or not the count number exceeds a predetermined threshold (step SB2).

The battery management unit 20 shortens the communication cycle with the cell monitoring unit 10 in a case where the count number is equal to or less than the predetermined threshold. In other words, the battery management unit 20 shortens the communication cycle by one step in a range between a standard value and a lower limit so as to increase the number of times of communication in the predetermined period. The battery management unit 20 can change the communication cycle stepwise within a range from the lower limit value to an upper limit value. A time width of one step when the battery management unit 20 extends or shortens the communication cycle stepwise may be adjusted in accordance with the SOC, the temperature, and the like, of the battery module BT. In this event, in a case where the communication cycle with the cell monitoring unit 10 is set at a predetermined standard value, the battery management unit 20 does not change the communication cycle (step SB4).

In a case where it is determined in step SB2 that the count number exceeds the predetermined threshold, the battery management unit 20 extends the communication cycle with the cell monitoring unit 10. In other words, the battery management unit 20 extends the communication cycle by one step in a range between the standard value and the upper limit value so as to reduce the number of times of communication in the predetermined period (step SB3).

After steps SB3 and SB4, the battery management unit 20 sets the value of the chargeable current and the value of the dischargeable current of the battery module BT using the communication cycle with the cell monitoring unit 10 (step SB5).

In the storage battery apparatus of the present embodiment, the communication cycle (standard value) in a normal state (in a case where no communication failure occurs) is set at, for example, 0.1 seconds, and the upper limit value of the communication cycle is set at, for example, 1 second. In a case where the battery management unit 20 determines that the count number exceeds the predetermined threshold in step SB2 in a case where the currently set communication cycle is 0.1 seconds, the communication cycle is extended from 0.1 seconds to, for example, 0.5 seconds.

Note that, in a case where the battery management unit determines that the count number exceeds the predetermined threshold in step SB2 when the currently set communication cycle is 1 second, the battery management unit 20 may notify the host apparatus to prohibit charging and discharging without extending the communication cycle.

FIGS. 4A to 4D are diagrams illustrating an example of values of a chargeable current and a dischargeable current corresponding to a communication cycle between a cell monitoring unit and the battery management unit, an SOC and an SOH of a battery module, and a temperature of the battery module. Here, an example of the values of the chargeable current and the dischargeable current of the battery module BT in a case where the SOH of the battery module BT is equal to or greater than the predetermined threshold value (a degradation degree is small) is illustrated.

FIG. 4A illustrates a value of the chargeable current corresponding to the communication cycle and the SOC of the battery module BT in a case where the SOH of the battery module BT is equal to or greater than the predetermined threshold and the temperature of the battery module BT is 25° C.

FIG. 4B illustrates a value of the dischargeable current corresponding to the communication cycle and the SOC of the battery module BT in a case where the SOH of the battery module BT is equal to or greater than the predetermined threshold and the temperature of the battery module BT is 25° C.

FIG. 4C illustrates a value of the chargeable current corresponding to the communication cycle and the SOC of the battery module BT in a case where the SOH of the battery module BT is equal to or greater than the predetermined threshold and the temperature of the battery module BT is –30° C.

FIG. 4D illustrates a value of the dischargeable current corresponding to the communication cycle and the SOC of the battery module BT in a case where the SOH of the battery module BT is equal to or greater than the predetermined threshold and the temperature of the battery module BT is −30° C.

For example, the battery management unit 20 may include a plurality of tables in which values of the chargeable currents and the dischargeable currents corresponding to the SOCs and the SOHs of the battery modules BT, the temperatures of the battery modules BT, and the communication cycles illustrated in FIGS. 4A to 4D are stored. In this event, the battery management unit 20 can select a corresponding table from the SOH and the temperature of the battery module BT and obtain the value of the chargeable current and the value of the dischargeable current corresponding to the communication cycle and the SOC of the battery module BT. The battery management unit 20 does not need to include a table for consecutive values for the temperature of the battery module BT, and may correct an error of the obtained value using the table for the value closest to the temperature of the battery module BT to obtain the value of the chargeable current and the value of the dischargeable current.

For example, the battery management unit 20 can calculate the SOHs of the plurality of battery modules BT based on the measurement values of the voltages and the temperatures received from the plurality of cell monitoring units 10 and the value of the current received from the current sensor SS. In a case where there is a variation in the SOHs of the plurality of battery modules BT, the battery management unit 20 can set the value of the chargeable current and the value of the dischargeable current corresponding to the SOH, the temperature, the SOC, and the communication cycle of the battery module BT having the largest degradation degree as the values of the plurality of battery modules BT.

For example, the battery management unit 20 can calculate the value of the chargeable current and the value of the dischargeable current from relationship between the SOC of the battery module BT and the communication cycle illustrated in FIGS. 4A and 4B in a case where the SOHs of the plurality of battery modules BT are equal to or greater than the predetermined threshold, and the temperature of the battery module BT is 25° C., by reducing the number of times of communication per unit time by setting the communication cycle at from 0.1 seconds to 0.5 seconds. According to FIGS. 4A and 4B, in a case where the communication cycle is 0.5 seconds, the chargeable current is 3 It [A] and the dischargeable current is 3 It [A] over the entire SOC region of the battery module BT. Note that It [A] is a rated current [Ah/h] per unit time.

For example, the battery management unit 20 can calculate the value of the chargeable current and the value of the dischargeable current from relationship between the SOC of the battery module BT and the communication cycle illustrated in FIGS. 4C and 4D in a case where the SOHs of the plurality of battery modules BT are equal to or greater than the predetermined threshold, and the temperature of the battery module BT is −30° C., by reducing the number of times of communication per unit time by setting the communication cycle at from 0.1 seconds to 1 seconds. According to FIG. 4C, in a case where the communication cycle is 1 second, the chargeable current is 1 It [A] in a case where the SOC of the battery module BT is equal to or higher than 50%, and the chargeable current is 3 It [A] in a case where the SOC of the battery module BT is less than 50%. According to FIG. 4D, in a case where the communication cycle is 1 second, the dischargeable current is 3 It [A] in a case where the SOC of the battery module BT is equal to or higher than 10%, and the dischargeable current is 1 It [A] in a case where the SOC of the battery module BT is less than 10%.

In a case where the SOH of the battery module BT is less than the predetermined threshold, the battery management unit 20 can calculate the value of the chargeable current and the value of the dischargeable current of the battery module BT based on the temperature and the SOC of the battery module BT and the communication cycle.

FIGS. 5A and 5B are diagrams illustrating an example of values of a chargeable current and a dischargeable current corresponding to a communication cycle between a cell monitoring unit and the battery management unit, an SOC and an SOH of a battery module, and a temperature of the battery module.

FIG. 5A illustrates a value of the chargeable current corresponding to the communication cycle and the SOC of the battery module BT in a case where the SOH of the battery module BT is less than the predetermined threshold and the temperature of the battery module BT is 25° C.

FIG. 5B illustrates a value of the dischargeable current corresponding to the communication cycle and the SOC of the battery module BT in a case where the SOH of the battery module BT is less than the predetermined threshold and the temperature of the battery module BT is 25° C.

For example, in a similar manner in a case where the SOH of the battery module BT is equal to or greater than the predetermined threshold, the battery management unit 20 may include a plurality of tables in which values of the chargeable currents and the dischargeable currents corresponding to the SOCs and the SOHs of the battery modules BT, the temperatures of the battery modules BT, and the communication cycles illustrated in FIGS. 5A and 5B are stored. In this event, the battery management unit 20 can select a corresponding table from the SOH and the temperature of the battery module BT and obtain the value of the chargeable current and the value of the dischargeable current corresponding to the communication cycle and the SOC of the battery module BT.

For example, the battery management unit 20 can calculate the value of the chargeable current and the value of the dischargeable current from relationship between the SOC of the battery module BT and the communication cycle illustrated in FIGS. 5A and 5B in a case where the SOHs of the plurality of battery modules BT are less than the predetermined threshold, and the temperature of the battery module BT is 25° C., by reducing the number of times of communication per unit time by setting the communication cycle at from 0.1 seconds to 0.5 seconds. According to FIG. 5A, in a case where the communication cycle is 0.5 second, the chargeable current is 1 It [A] in a case where the SOC of the battery module BT is equal to or higher than 80%, and the chargeable current is 3 It [A] in a case where the SOC of the battery module BT is less than 80%. According to FIG. 5B, in a case where the communication cycle is 0.5 second, the dischargeable current is 3 It [A] in a case where the SOC of the battery module BT is equal to or higher than 15%, and the dischargeable current is 1 It [A] in a case where the SOC of the battery module BT is less than 15%.

The battery management unit 20 notifies the host apparatus of the value of the chargeable current and the value of the dischargeable current obtained as described above (step SB6).

Subsequently, the battery management unit 20 acquires a current value from the current sensor SS (step SB7). In this event, the battery management unit 20 acquires the current value from the current sensor SS at a predetermined sampling rate over a predetermined period.

The battery management unit 20 determines whether or not the discharge current of the battery module BT continuously exceeds a limit value (discharge current limit value) in the predetermined period, from the current value in the predetermined period acquired from the current sensor SS (step SB8). In this event, the limit value of the discharge current is an upper limit value of the current which can be safely discharged continuously, and may be the same as the value of the dischargeable current.

In a case where the value of the discharge current does not continuously exceed the limit value in the predetermined period, the battery management unit 20 notifies the host apparatus of permission of discharging (step SB9).

In a case where the value of the discharge current exceeds the limit value continuously in the predetermined period, the battery management unit 20 notifies the host apparatus of a request for stopping discharging (step SB 10).

In addition, the battery management unit 20 determines whether or not the charge current of the battery module BT continuously exceeds a limit value (charge current limit value) in the predetermined period, from the current value in the predetermined period acquired from the current sensor SS (step SB11). In this event, the limit value of the charge current is an upper limit value of the current which can be safely charged continuously, and may be the same as the value of the chargeable current.

In a case where the value of the charge current does not continuously exceed the limit value in the predetermined period, the battery management unit 20 notifies the host apparatus of permission of charging (step SB12).

In a case where the value of the charge current exceeds the limit value continuously in the predetermined period, the battery management unit 20 notifies the host apparatus of a request for stopping charging (step SB 13).

As described above, in a case where the host apparatus charges or discharges the battery module BT while deviating from the charge current limit value or the discharge current limit value, safety of the storage battery apparatus cannot be secured. Thus, the battery management unit 20 requests the host apparatus to stop charging or discharging (or both charging and discharging) the battery module BT. This makes it possible to ensure safety of the storage battery apparatus. In a case where the SOC of the battery module BT is high, the battery management unit 20 does not need to request to stop discharging of the battery module BT. In a case where the SOC of the battery module BT is low, the battery management unit 20 does not need to request to stop charging of the battery module BT. The battery management unit 20 determines regarding to the charge and the discharge of the battery module BT in accordance with the value of the SOC of the battery module BT, thereby enhancing the availability of the storage battery apparatus.

As described above, in the storage battery apparatus of the present embodiment, in a case where a communication state is poor, by reducing a frequency of communication between the battery management unit 20 and the cell monitoring units 10, a situation where the measurement values of the voltages of the battery cells and the measurement values of the temperatures of the battery modules BT are not continuously received is avoided.

For example, in a case where the battery management unit 20 cannot monitor the voltages and the temperature of the battery module BT due to a communication failure for a predetermined period, the storage battery apparatus may stop even if the battery module BT is normal. In a case where the storage battery apparatus stops, there is no power supply to a load apparatus, which causes decrease in reliability of the storage battery apparatus.

On the other hand, in the storage battery apparatus of the present embodiment, in a case where the battery module BT is normal, in a case where it is temporarily difficult to perform communication between the battery management unit 20 and the cell monitoring unit 10 due to a communication failure, the storage battery apparatus is prevented from stopping, so as to secure the reliability of the storage battery apparatus.

In other words, according to the storage battery apparatus of the present embodiment, it is possible to provide a storage battery apparatus with high reliability which performs communication using radio waves.

Next, a storage battery apparatus according to a second embodiment will be described in detail with reference to the drawings.

The storage battery apparatus of the present embodiment is similar to the storage battery apparatus in the first embodiment in that wireless communication using radio waves is performed between a battery management unit 20 and cell monitoring units 10, but is different from the battery storage apparatus in the first embodiment in that a communication system for switching a plurality of channels is adopted.

FIG. 6 is a diagram for explaining an example of a scheme of wireless communication to be performed between the cell monitoring unit and the battery management unit.

In the storage battery apparatus of the present embodiment, wireless communication is performed between the battery management unit 20 and the cell monitoring units 10 using a communication scheme (for example, Bluetooth) for switching a plurality of channels through frequency hopping (FH), or the like.

In this example, one channel is shared by the plurality of cell monitoring units 10. In FIG. 6, an example of channels used by a first module group MDL1 including the plurality of cell monitoring units 10 and channels used by a second module group MDL2 including the plurality of other cell monitoring units 10 are illustrated in chronological order. In FIG. 6, shading in a frequency direction indicates intensity of an electromagnetic wave. A dark portion indicates a strong electromagnetic wave, and a light portion indicates a weak electromagnetic wave.

A region CHA illustrated in FIG. 6 is a frequency band of an electromagnetic wave greatly affected by interfering radio waves. In a case where a channel overlapping with the region CHA is used, it is difficult to perform communication due to a communication failure.

FIG. 7 is a diagram for explaining an example of a scheme of wireless communication to be performed between the cell monitoring unit and the battery management unit in the storage battery apparatus of a second embodiment.

As described above, in order to avoid a communication failure due to interfering radio waves, in the storage battery apparatus of the present embodiment, the battery management unit 20 and the plurality of cell monitoring units 10 perform communication using channels while skipping a channel overlapping with the region CHA. In this case, while influence of interfering radio waves can be avoided, the plurality of module groups MDL1 and MDL2 perform communication using limited channels, and there is a possibility that the communication cannot be established due to congestion.

Thus, in the storage battery apparatus of the present embodiment, when the number of channels which cannot be used due to interfering radio waves exceeds a predetermined threshold, the battery management unit 20 extends the communication cycle with the cell monitoring unit 10 (reduces the number of times of communication per unit time), and sets the value of the chargeable current and the value of the dischargeable current corresponding to the communication cycle to limit the charge/discharge current.

Hereinafter, an example of operation of the battery management unit of the storage battery apparatus of the present embodiment will be described.

Figure 8:
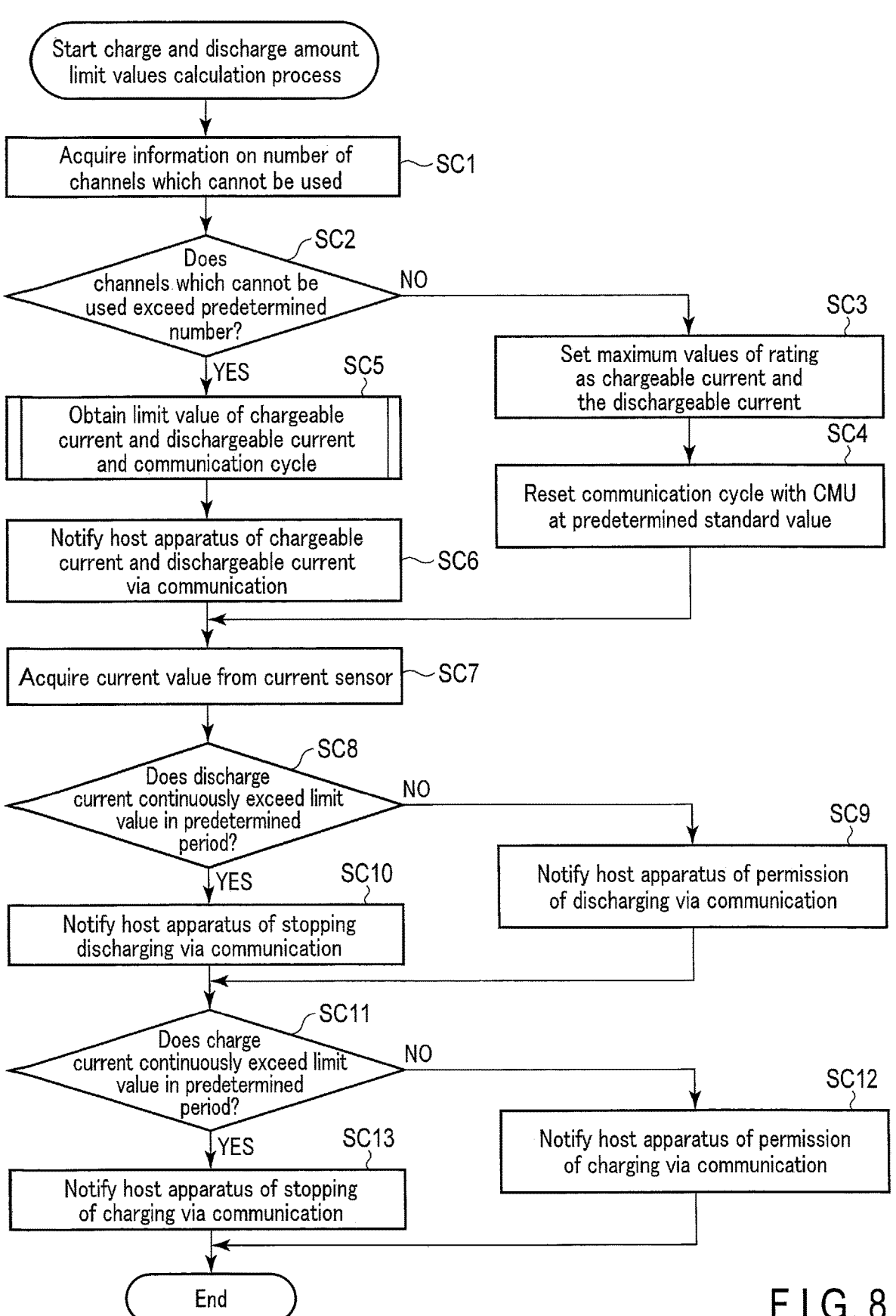
FIG. 8 is a flowchart for explaining another example of the operation of the battery management unit in the storage battery apparatus according to an embodiment.

FIG. 8 is a flowchart for explaining another example of the operation of the battery management unit in the storage battery apparatus according to an embodiment. Here, an example of the operation in step SA8 of the battery management unit 20 in the storage battery apparatus according to the first embodiment will be described.

The battery management unit 20 acquires information on the number of channels which cannot be used due to interfering radio waves (step SC1), and determines whether or not the number of channels which cannot be used exceeds a predetermined threshold (step SC2).

In a case where the number of channels which cannot be used is equal to or less than the predetermined threshold, the battery management unit 20 sets the chargeable current and the dischargeable current of a battery module BT at maximum values of rating, and transmits the set values to the host apparatus (step SC3).

Subsequently, the battery management unit 20 sets the communication cycle with the cell monitoring unit 10 at a normal value (predetermined standard value) (step SC4). In the present embodiment, the normal value of the communication cycle with the cell monitoring unit 10 is 0.1 seconds.

In a case where it is determined in step SC2 that the number of channels which cannot be used exceeds the predetermined threshold, the battery management unit 20 sets the values of the chargeable current and the dischargeable current in accordance with the communication cycle, the SOC and the SOH of the battery module BT, and the temperature of the battery module BT by extending the communication cycle with the cell monitoring unit 10, for example, in a similar manner to step SB5 of the first embodiment described above (step SC5).

Processing from step SC6 to step SC 13 is similar to the processing from step SB6 to step SB13 of the first embodiment described above.

As described above, in the storage battery apparatus of the present embodiment, in a case where a communication state is poor, by reducing a frequency of communication between the battery management unit 20 and the cell monitoring units 10, a congestion of communication in available channels is avoided, and a situation where the measurement values of the temperatures of the battery modules BT is not received is avoided.

In other words, according to the storage battery apparatus of the present embodiment, it is possible to provide a storage battery apparatus with high reliability which performs communication using radio waves.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage battery apparatus comprising:
a plurality of storage battery modules, each of the storage battery modules including a battery module including a plurality of battery cells, and a cell monitoring unit configured to measure voltages of the battery cells and a temperature of at least one portion of the battery module;
a current sensor configured to detect a value of a current flowing through the plurality of storage battery modules; and
a battery management unit configured to perform communication with the plurality of cell monitoring units using a radio wave and periodically receive measurement values of the voltages of the battery cells and a measurement value of the temperature of the battery module, and configured to perform communication with the current sensor using a wired transmission line and receive a detection value from the current sensor,
wherein in a case where it is determined that there is interference in communication with the plurality of cell monitoring units, the battery management unit extends a communication cycle with the cell monitoring units, sets a value of a chargeable current and a value of a dischargeable current of the battery module, which correspond to at least the communication cycle, and notifies a host apparatus of the set values.

2. The storage battery apparatus according to claim 1, wherein the battery management unit counts a number of times of retransmission with the plurality of cell monitoring units due to a failure of the communication, and determines that there is interference in the communication with the plurality of cell monitoring units in a case where the number of times of retransmission in a predetermined period exceeds a predetermined threshold.

3. The storage battery apparatus according to claim 1, wherein the battery management unit performs the communication with the plurality of cell monitoring units using a scheme of switching a plurality of channels, and determines that there is interference in the communication with the plurality of cell monitoring units in a case where a number of channels unavailable for the communication due to interference exceeds a predetermined threshold.

4. The storage battery apparatus according to claim 1, wherein a value of a chargeable current and a value of a dischargeable current of the battery module set by the battery management unit are values corresponding to the communication cycle, an SOH and an SOC of the battery module, and a temperature of at least one portion of the battery module.

5. The storage battery apparatus according to claim 1, further comprising:
a current sensor configured to detect a current flowing through the plurality of battery modules,
wherein the battery management unit acquires a value of the current detected by the current sensor, transmits a request for stopping charging of the battery module to the host apparatus in a case where a value of a charge current of the battery module exceeds a charge current limit value continuously for a predetermined period, and transmits a request for stopping discharging of the battery module to the host apparatus in a case where a value of a discharge current of the battery module exceeds a discharge current limit value continuously for a predetermined period.

* * * * *